(12) United States Patent
Liang et al.

(10) Patent No.: US 12,047,433 B2
(45) Date of Patent: Jul. 23, 2024

(54) MODEL FILE ISSUING METHOD, PLATFORM, SYSTEM, TERMINAL AND READABLE STORAGE MEDIUM

(71) Applicant: BEIJING BYTEDANCE NETWORK TECHNOLOGY CO., LTD., Beijing (CN)

(72) Inventors: Yufei Liang, Beijing (CN); Shu Liu, Beijing (CN); Enlong Xia, Beijing (CN); Chundian Liu, Beijing (CN); Dongwei Yao, Beijing (CN); Zihan Qi, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 300 days.

(21) Appl. No.: 17/618,409

(22) PCT Filed: May 22, 2020

(86) PCT No.: PCT/CN2020/091888
§ 371 (c)(1),
(2) Date: Dec. 10, 2021

(87) PCT Pub. No.: WO2020/248801
PCT Pub. Date: Dec. 17, 2020

(65) Prior Publication Data
US 2022/0279035 A1    Sep. 1, 2022

(30) Foreign Application Priority Data

Jun. 11, 2019 (CN) .......................... 201910499576.X

(51) Int. Cl.
*G06F 13/00* (2006.01)
*G06F 8/61* (2018.01)
(Continued)

(52) U.S. Cl.
CPC ................ *H04L 67/06* (2013.01); *G06F 8/61* (2013.01); *H04L 67/60* (2022.05)

(58) Field of Classification Search
CPC ......... H04L 67/06; H04L 67/60; H04L 65/40; G06F 8/61; G06F 8/65; G06F 9/44505
(Continued)

(56) References Cited

U.S. PATENT DOCUMENTS

2018/0329960 A1    11/2018 Liu et al.

FOREIGN PATENT DOCUMENTS

| CN | 103838851 A | 6/2014 |
| CN | 104102545 A | 10/2014 |

(Continued)

OTHER PUBLICATIONS

International Patent Application No. PCT/CN2020/091888; Int'l Written Opinion and Search Report; dated Aug. 24, 2020; 6 pages.
(Continued)

*Primary Examiner* — Kenneth R Coulter
(74) *Attorney, Agent, or Firm* — BakerHostetler

(57) ABSTRACT

A method for transmitting a model file is provided. The method includes: transmitting, in response to a target sticker triggered by a user, an algorithm acquisition request to a transmission platform of a model file, and receiving a sticker resource packet fed back by the transmission platform of the model file, where the sticker resource packet includes a target algorithm corresponding to a target sticker; determining a target model corresponding to the target algorithm according to a pre-stored correspondence table between algorithms and model files; determining whether a model file of the target model is stored locally; and transmitting a request for downloading the model file of the target model to the transmission platform of the model file, to acquire the
(Continued)

model file of the target model, if it is determined that the model file of the target model is not stored locally.

20 Claims, 5 Drawing Sheets

(51) Int. Cl.
*H04L 67/06* (2022.01)
*H04L 67/60* (2022.01)

(58) Field of Classification Search
USPC .................................................. 709/230, 223
See application file for complete search history.

(56) References Cited

FOREIGN PATENT DOCUMENTS

| | | |
|---|---|---|
| CN | 106373170 A | 2/2017 |
| CN | 107562415 A | 1/2018 |
| CN | 109033393 A | 12/2018 |
| CN | 109086401 A | 12/2018 |
| CN | 109408132 A | 3/2019 |
| EP | 3462309 A1 | 4/2019 |
| JP | 2000-172657 A | 6/2000 |
| JP | 2001-306342 A | 11/2001 |
| JP | 2002-007134 A | 1/2002 |
| JP | 2018-190124 A | 11/2018 |
| WO | WO 2020/248801 A1 | 12/2020 |

OTHER PUBLICATIONS

"Research on performance Optimization of mobile image social front-end"; China Academic Journal Electronic Publishing House; © 1994-2022; Sep. 2018; p. 241-242 (contains English Abstract).

MODEL FILE ISSUING METHOD, PLATFORM, SYSTEM, TERMINAL AND READABLE STORAGE MEDIUM

CROSS REFERENCE OF RELATED APPLICATION

The present application is a National phase application of PCT international patent application PCT/CN2020/091888, filed on May 22, 2020, which claims the priority to Chinese Patent Application No. 201910499576.X, titled "MODEL FILE ISSUING METHOD, PLATFORM, SYSTEM, TERMINAL AND READABLE STORAGE MEDIUM", filed on Jun. 11, 2019 with the State Intellectual Property Office of the PRC, both of which are incorporated herein by reference in their entireties.

FIELD

The present disclosure relates to computer technology, and in particular to a method for transmitting a model file, a transmission platform of a mode file, a transmission system of a model file, a terminal and a readable storage medium.

BACKGROUND

With the development of computer technologies and mobile terminals, a mobile terminal provides more function choices for different applications by utilizing different identification algorithms. Generally, multiple stickers are arranged in the application, and the stickers are used to render or filter an image. Based on different effects presented by the stickers, different identification algorithms are adopted by the application. Accordingly, models files on which the identification algorithms depend differ from each other.

In the conventional technology, the identification algorithm and corresponding model files are packaged together in the application. When a user downloads and installs an application in a terminal, the identification algorithm and the corresponding model files are downloaded together to the terminal.

In the above method, a size of a downloading installation packet of the application is large, resulting in that packet loss occurs with a great probability during a downloading process, and the downloading consumes a lot of time, and thus not being beneficial to usage.

SUMMARY

For the problem described above, a method for transmitting a model file, a transmission platform of a model file, a transmission system of a model file, a terminal and a readable storage medium are provided according to the present disclosure.

In an aspect, a method for transmitting a model file is provided. The method includes: transmitting, in response to a target sticker triggered by a user, an algorithm acquisition request to a transmission platform of a model file, and receiving a sticker resource packer fed back by the transmission platform of the model file, where the sticker resource packet includes a target algorithm corresponding to a target sticker; determining a target model corresponding to the target algorithm according to a pre-stored correspondence table between algorithms and model files; determining whether a model file of the target model is stored locally; and transmitting a request for downloading the model file of the target model to the transmission platform of the model file, to acquire the model file of the target model fed back by the transmission platform of the model file, if it is determined that the model file of the target model is not stored locally.

In an embodiment, in a case that it is determined that the model file of the target model is stored locally, the method further includes: transmitting an update request of the model file to the transmission platform of the model file, and receiving a model file of the target model with a latest version fed back by the transmission platform of the model file.

In an embodiment, the update request includes version information of the model file of the target model stored locally. The process of receiving a model file of the target model with a latest version fed back by the transmission platform of the model file includes: receiving a first message transmitted by the transmission platform of the model file and indicating that the model file is unnecessary to be updated, where the first message is transmitted when the transmission platform of the model file determines that the model file of the target model has the latest version based on the version information included in the update request; or receiving the model file of the target model with the latest version transmitted by the transmission platform of the model file, where the model file of the target model with the latest version is transmitted when the transmission platform of the model file determines that the model file of the target model has no latest version based on the version information included in the update request.

In an embodiment, the update request of the model file further includes a terminal type, so that the transmission platform of the model file feeds back a model file of the target model with the latest version which matches with the terminal type.

In an embodiment, the request for downloading the model file of the target model further includes a terminal type, so that the transmission platform of the model file feeds back a model file matching with the terminal type.

In an embodiment, before the process of transmitting, in response to a target sticker triggered by a user, an algorithm acquisition request to a transmission platform of a model file, the method further includes: transmitting an initialization request to the transmission platform of the model file, to acquire the correspondence table between algorithms and model files transmitted by the transmission platform of the model file.

In another aspect, a method for transmitting a model file is provided. The method includes: receiving an algorithm acquisition request transmitted by a terminal, where the algorithm acquisition request includes a target sticker triggered by a user; transmitting a sticker resource packet to the terminal in response to the acquisition request, where the sticker resource packet includes a target algorithm corresponding to the target sticker, and the terminal determines whether a model file of the target model corresponding to the target algorithm is stored locally; and feeding back the model file of the target model to the terminal when a request for downloading the model file of the target model transmitted by the terminal is received, where the request for downloading the model file of the target model is transmitted when the terminal determines that no model file of the target model corresponding to the target algorithm is stored locally.

In an embodiment, the method further includes: receiving an update request of the model file transmitted by the terminal, where the update request includes version information of the model file of the target model stored in the terminal; determining, according to the version information, whether the model file of the target model stored in the terminal has a latest version; transmitting a first message indicating that update is unnecessary to the terminal if it is determined that the model file of the target model stored in the terminal has the latest version; and transmitting the model file of the target model with the latest version to the terminal, if it is determined that the model file of the target model stored in the terminal has no latest version.

In an embodiment, the update request of the model file further includes a terminal type. The process of transmitting the model file of the target model with the latest version to the terminal includes: determining, according to the terminal type, a model file of the target model with the latest version which matches with the terminal type; and transmitting the model file of the target model with the latest version to the terminal.

In an embodiment, the request for downloading a model file of the target model further includes a terminal type. The process of feeding back the model file of the target model to the terminal includes: determining, according to the terminal type, a model file of the target model matching the terminal type; and transmitting the mode file of the target model to the terminal.

In an embodiment, the method further includes: transmitting, in response to an initialization request issued by the terminal, a pre-stored correspondence table between algorithms and model files to the terminal.

In another aspect, a terminal is provided. The terminal includes a first communication module and a first processing module. The first communication module is configured to transmit, in response to a target sticker triggered by a user, an algorithm acquisition request to a transmission platform of a model file, and receive a sticker resource packet fed back by the transmission platform of the model file, where the sticker resource packet includes a target algorithm corresponding to a target sticker. The first processing module is configured to determine a target model corresponding to the target algorithm according to a pre-stored correspondence table between algorithms and model files, and determine whether a model file of the target model is stored locally. In a case that the first processing module determines that no model file of the target model is stored locally, the first communication module is configured to transmit a request for downloading the model file of the target model to the transmission platform of the model file, to acquire the model file of the target model fed back by the transmission platform of the model file.

In another aspect, a transmission platform of a model file is provided according to the present disclosure. The transmission platform includes a second communication module and a second processing module. The second communication module is configured to receive an algorithm acquisition request transmitted by a terminal. The algorithm acquisition request includes a target stocker triggered by a user. The second processing module is configured to determine a sticker resource packet in response to the acquisition request and transmit the sticker resource packet to the terminal via the second communication module. The sticker resource packet includes a target algorithm corresponding to the target sticker, so that the terminal determines whether a model file of the target model corresponding to the target algorithm is stored locally. The second communication module is further configured to feed back the model file of the target model to the terminal when a request for downloading the model file of the target model transmitted by the terminal is received by the second communication module.

The request for downloading the model file of the target model is transmitted when the terminal determines that no model file of the target model corresponding to the target algorithm is stored locally.

In another aspect, a transmission platform of a model file is provided according to the present disclosure. The transmission platform includes a terminal and a transmission platform of a model file. The terminal is configured to perform the method for transmitting a model file described above, and the transmission platform of the model file is configured to perform the method for transmitting a model file described above.

In another aspect, a terminal is provided according to the present disclosure. The terminal includes a memory, a processor and a computer program. The computer program is stored in the memory, and is executed by the processor to perform the method described above.

In another aspect, a transmission platform of a model file is provided according to the present disclosure. The transmission platform includes a memory, a processor and a computer program. The computer program is stored in the memory, and is executed by the processor to perform the method described above.

In a last aspect, a non-transitory readable storage medium storing a computer program is provided according to the present disclosure. The computer program is performed by a processor to perform the method described above.

According to the method of transmitting a model file, the transmission platform of a model file, the transmission system of a model file, the terminal and the readable storage medium provided in the present disclosure, the terminal transmits an algorithm acquisition request to a transmission platform of a model file in response to a target sticker triggered by a user, and receives a sticker resource packet fed back by the transmission platform. The sticker resource packet includes a target algorithm corresponding to a target sticker. The terminal determines a target model corresponding to the target algorithm according to a pre-stored correspondence table between algorithms and model files, and determines whether the model file of the target model is stored locally. In a case that the model file is not stored in the terminal, the terminal transmits a request for downloading the model file of the target model to the transmission platform of the model file, to acquire the model file of the target model fed back by the transmission platform, so that the model file is downloaded only when the user triggers the target sticker and no model file is stored in the terminal. That is, the model file of an application can be set separately from other installation files of the application. According to the technical solutions described above, a size of an installation packet of the application is effectively decreased, thereby shortening time for downloading the installation packet of the application.

DETAILED DESCRIPTION

Figure 1:
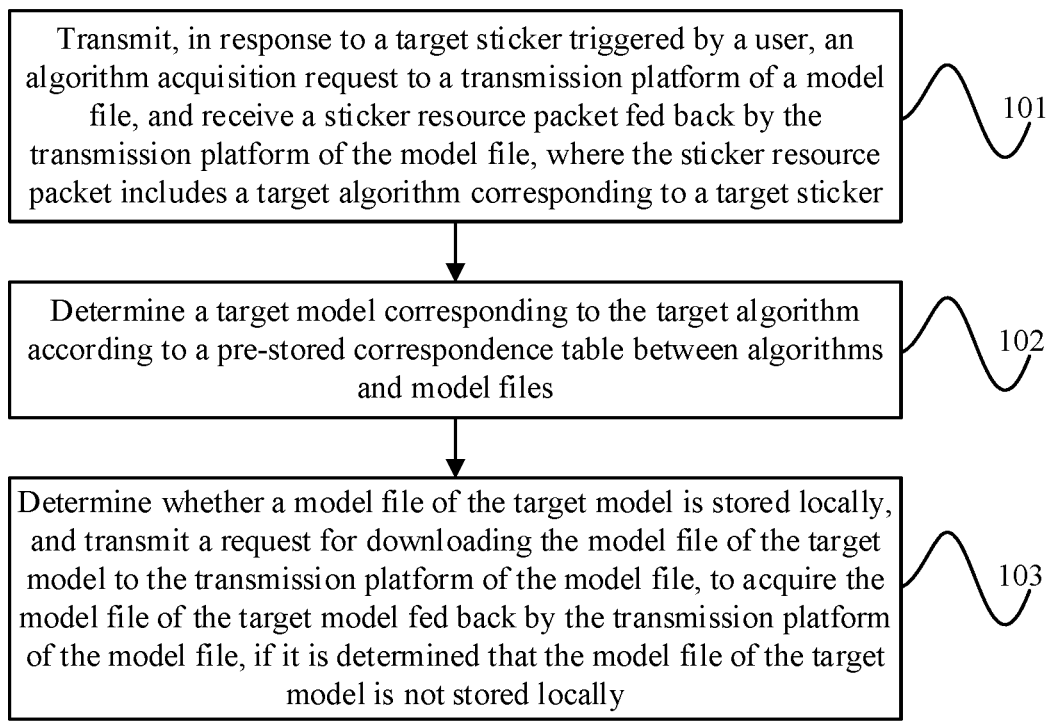
FIG. 1 is a schematic flowchart of a method for transmitting a model file according to a first embodiment of the present disclosure.

In order to illustrate objects, technical solutions and advantages of the present disclosure clearer, technical solutions in embodiments of the present disclosure are described clearly and completely hereinafter with reference to the accompanying drawings in the embodiments of the present disclosure.

With the development of computer technologies and mobile terminals, a mobile terminal provides more function choices for different applications by utilizing different identification algorithms. Generally, multiple stickers are arranged in the application, and the stickers are used to render or filter an image. Based on different effects presented by the stickers, different identification algorithms are adopted by the application. Accordingly, models files on which the identification algorithms depend differ from each other.

In the conventional technology, the identification algorithm and corresponding model files are packaged together in the application. When a user downloads and installs an application in a terminal, the identification algorithm and the corresponding model files are downloaded together to the terminal.

In the above method, a size of a downloading installation packet of the application is large, resulting in that packet loss occurs with a great probability during a downloading process, and the downloading consumes a lot of time, and thus not being beneficial to usage.

In order to solve the above problem, a transmission method of a model file, a transmission platform of a model file, a transmission system of a model file, a terminal and a readable storage medium are provided according to the present disclosure.

It should be noted that a network architecture described in the present disclosure includes a terminal and a transmission platform of a model file. The terminal may be a mobile intelligent hardware device, such as a smartphone and a tablet computer. The terminal may be installed with an application, and provides an interaction interface for a user, so that the user operates and performs interaction. The transmission platform of the model file may be a server or a server cluster arranged at cloud. The transmission platform may process services according to preset logic and perform data interaction with terminal over a network.

It should be noted that the terminal may be installed with an application which may provide corresponding functions for the user. The application is provided with multiple stickers for rendering or filtering an image. For example, a camera application may provide shooting or photographing function for the user, and the sticker may be multiple filter or editing components arranged in the camera application. The filter and editing components may be triggered by the user, to render an image or a video for the user or edit an image or a video for the user. Since different stickers achieve different effects, different identification algorithms should be adopted when the image or video is processed based on the filter or editing component triggered by the user. That is, model files on which different identification algorithms depend are called to render or edit the image or video.

As described above, in the conventional technology, in order to achieve the sticker function of the application, not only configuration files and execution files are packaged in the installation package of the application, but also multiple identification algorithms and model files corresponding to the identification algorithms are packaged in the installation package. In this case, the size of the installation package of the application is large, and thus not being beneficial to download and install the application by the user.

In order to solve the problem, algorithms and model files corresponding to the stickers are separated from the configuration files and the executions files of the application in the present disclosure, and a transmission platform of a model file is arranged at cloud, so that the algorithm and the model file are acquired by interaction between the terminal and the transmission platform of the model file. That is, when the terminal installs an application for the first time, the installation package acquired by the terminal includes only the configuration files and the executions files, so that the size of the installation package is greatly decreased, thereby improving downloading efficiency and installation efficiency.

FIG. 1 is a schematic flowchart of a method for transmitting a model file according to a first embodiment of the present disclosure. As shown in FIG. 1, the method includes steps 101 to 103 as follows.

In step 101, in response to a target sticker triggered by a user, an algorithm acquisition request is transmitted to a transmission platform of a model file, and a sticker resource packet fed back by the transmission platform of the model file is received. The sticker resource packet includes a target algorithm corresponding to the target algorithm.

In step 102, a target model corresponding to the target algorithm is determined according to a pre-stored correspondence table between algorithms and model files.

In step 103, it is determined whether a model file of the target model is stored locally; and if the model file of the target model is not stored locally, a request for downloading the model file of the target model is transmitted to the transmission platform of the model file, to acquire the model file of the target model fed back by the transmission platform of the model file.

It should be noted that, the method for transmitting a model file described in the present disclosure may be performed by the terminal described above.

The user may select the target sticker from multiple stickers provided by the application through an application interaction interface of the terminal. The terminal transmits an algorithm acquisition request to the transmission platform of the model file in response to the target sticker triggered by the user. The algorithm acquisition request includes identification information of the target sticker, so that the transmission platform of the model file determines the target algorithm based on the identification information of the target sticker after receiving the algorithm acquisition request, and generates a sticker resource packet including the target algorithm and feeds back the sticker resource packet to the terminal.

The terminal analyzes the received sticker resource packet to acquire the target algorithm included in the sticker resource packet. Then, the terminal determines the target model on which the target algorithm depends based on a pre-stored correspondence table between algorithms and model files.

The correspondence table indicates association or correspondence between algorithms and model files, that is, a file identifier or a file name of a model file on which a certain algorithm depends. The correspondence table is generally pre-established by a developer during a process of developing the algorithm, the model file and the sticker. When the developer finishes developing of the algorithm, the model file and the sticker, the correspondence table in the transmission platform of the model file may be updated.

In an embodiment, the correspondence table between the algorithms and the model files is pre-stored in the terminal. After the application is installed, the terminal may acquire the correspondence table during a process of initializing. That is, the terminal transmits an initialization request to the transmission platform of the model file, to acquire the correspondence table between the algorithms and the model files transmitted by the transmission platform of the model file.

After determining the target model, the terminal determines whether a model file of the target model is stored locally. The target sticker triggered by the user may be triggered for the first time or not. In the present disclosure, the configuration files and the execution files are packaged independently relative to the algorithm of the sticker of the application, that is, the model file. In this case, when the target sticker is triggered for the first time, the terminal needs to acquire a mode file on which the target algorithm of the target sticker depends from the transmission platform of the model file. When the target sticker is not triggered for the first time, the terminal may store the model file acquired when the target sticker is triggered previously, that is, the terminal may directly run the model file on which the target algorithm of the target sticker depends. That is, when determining that no model file of the target model is stored locally, the terminal transmits a request for downloading the model file of the target model to the transmission platform of the model file, so that the transmission platform of the model file transmits the model file of the target model to the terminal in response to the downloading request.

Generally, model files are different for different brands, models and loaded operating systems of the terminal. Therefore, in an embodiment, the request for downloading the model file of the target model transmitted by the terminal to the transmission platform of the model file includes a terminal type, in order to ensure matching between the model file and the terminal. The transmission platform of the model file determines a model file matching with the terminal type according to the terminal type included in the request, and feeds back the model file.

With continuous upgrading and development of technology, algorithms and model files are updated. In an embodiment, when the terminal determines that the model file of the target model is stored locally, the terminal may transmit an update request for the model file to the transmission platform of the model file, and receives the model file of the target model with a latest version fed back by the transmission platform of the model file, so that the file executed by the terminal is always the model file with the latest version during running.

It should be noted, for steps and principles of the method performed by the transmission platform of the model file, one may refer to corresponding content described in other embodiments, and details are not repeated herein.

According to the method of transmitting a model file in the present disclosure, the terminal transmits an algorithm acquisition request to a transmission platform of a model file in response to a target sticker triggered by a user, and receives a sticker resource packet fed back by the transmission platform. The sticker resource packet includes a target algorithm corresponding to a target sticker. The terminal determines a target model corresponding to the target algorithm according to a pre-stored correspondence table between algorithms and model files, and determines whether the model file of the target model is stored locally. In a case that the model file is not stored in the terminal, the terminal transmits a request for downloading the model file of the target model to the transmission platform of the model file, to acquire the model file of the target model fed back by the transmission platform, so that the model file is downloaded only when the user triggers the target sticker and no model file is stored in the terminal. That is, the model file of an application can be set separately from other installation files of the application. According to the technical solutions described above, the size of an installation packet of the application is effectively decreased, thereby shortening time for downloading the installation packet of the application.

Figure 2:
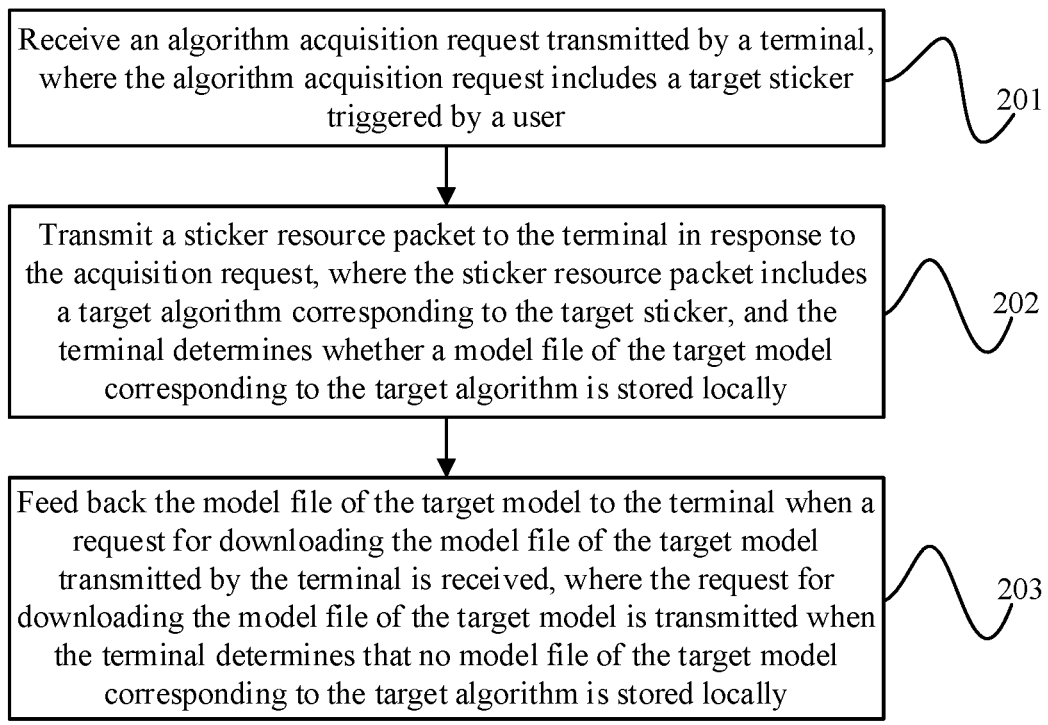
FIG. 2 is a schematic flowchart of a method for transmitting a model file according to a second embodiment of the present disclosure.

FIG. 2 is a schematic flowchart of a method for transmitting a model file according to a second embodiment of the present disclosure. As shown in FIG. 2, the method includes steps 201 to 203 as follows.

In step 201, an algorithm acquisition request transmitted by a terminal is received. The algorithm acquisition request includes a target sticker triggered by the user.

In step 202, in response to the acquisition request, a sticker resource package is transmitted to the terminal. The sticker resource package includes a target algorithm corresponding to the target sticker, so that the terminal determines whether a model file of the target model corresponding to the target algorithm is stored locally.

In step 203, when a request for downloading the model file of the target model transmitted by the terminal is received, the model file of the target model is fed back to the terminal. The request for downloading the model file of the target model is transmitted when the terminal determines that no model file of the target model corresponding to the target algorithm is stored locally.

It should be noted that, the method for transmitting a model file in the present disclosure may be performed by the transmission platform of the model file described above.

The user may select the target sticker from multiple stickers provided by the application through an application interaction interface of the terminal. The transmission platform of the model file receives an algorithm acquisition request transmitted by the terminal. The algorithm acquisition request includes identification information of the target sticker. The transmission platform of the model file determines the target algorithm based on the identification information of the target sticker after receiving the algorithm acquisition request, and generates a sticker resource packet including the target algorithm and feeds back the sticker resource packet to the terminal.

Then, the terminal determines the target model of the target algorithm and determines whether the model file of the target model is stored in the terminal, according to the target sticker in the sticker resource packet and a pre-stored correspondence table between algorithms and model files.

Then, based on a result of determining whether the model file is stored locally by the terminal, the transmission platform of the model file receives the request for downloading the model file of the target model transmitted by the terminal. In response to the request, the transmission platform of the model file determines a corresponding model file in its storage space, and transmits the model file to the terminal for use. It should be noted that, the request for downloading the model file of the target model is transmitted when the terminal determines that no model file of the target model corresponding to the target algorithm is stored. That is, the terminal does not transmit the request for downloading the model file of the target model, in a case that the terminal determines that the mode file of the target model corresponding to the target algorithm is stored locally.

Generally, model files are different for different brands, models and loaded operating systems of the terminal. Therefore, in an embodiment, the request for downloading the model file of the target model received by the transmission platform of the model file includes a terminal type, in order to ensure matching between the model file and the terminal. The transmission platform of the model file determines a model file matching with the terminal type according to the terminal type included in the request, and feeds back the model file to the terminal.

That is, the request for downloading the model file of the target model further includes a terminal type. The process of feeding back the model file of the target model to the terminal includes: determining a model file of the target model matching with the terminal type, based on the terminal type; and transmitting the model file of the target model to the terminal.

In an embodiment, the transmission platform of the model file receives an initialization request issued by the terminal. In response to the initialization request, the transmission platform of the model file transmits a pre-stored correspondence table between algorithms and model files to the terminal. After an application is installed, the terminal may transmit the initialization request to the transmission platform of the model file during a process of initializing of the application, to acquire the correspondence table. The correspondence table indicates association or correspondence between algorithms and model files, that is, a file identifier or a file name of a model file on which a certain algorithm depends. The correspondence table is generally pre-established by a developer during a process of developing the algorithm, the model file and the sticker. When the developer finishes developing of the algorithm, the model file and the sticker, the correspondence table in the transmission platform of the model file may be updated.

It should be noted that, for steps and principles of the method performed by the terminal, one may refer to corresponding content of other embodiments, and details are not repeated herein.

According to the method of transmitting a model file in the present disclosure, the terminal transmits an algorithm acquisition request to a transmission platform of a model file in response to a target sticker triggered by a user, and receives a sticker resource packet fed back by the transmission platform. The sticker resource packet includes the algorithm acquisition request transmitted by the terminal. The algorithm acquisition request includes the target sticker triggered by the user. In response to the acquisition request, the sticker resource packet is transmitted to the terminal. The sticker resource packet includes a target algorithm corresponding to a target sticker, so that the terminal determines whether the model file of the target model corresponding to the target algorithm is stored locally. When the request for downloading the model file of the target model transmitted by the terminal is received, the model file of the target model is fed back to the terminal. The request for downloading the model file of the target model is transmitted when the terminal determines that no model file of the target model corresponding to the target algorithm is stored locally, so that the model file is downloaded only when the user triggers the target sticker and no model file is stored in the terminal. That is, the model file of an application can be set separately from other installation files of the application. According to the technical solutions described above, a size of an installation packet of the application is effectively decreased, thereby shortening time for downloading the installation packet of the application.

Figure 3:
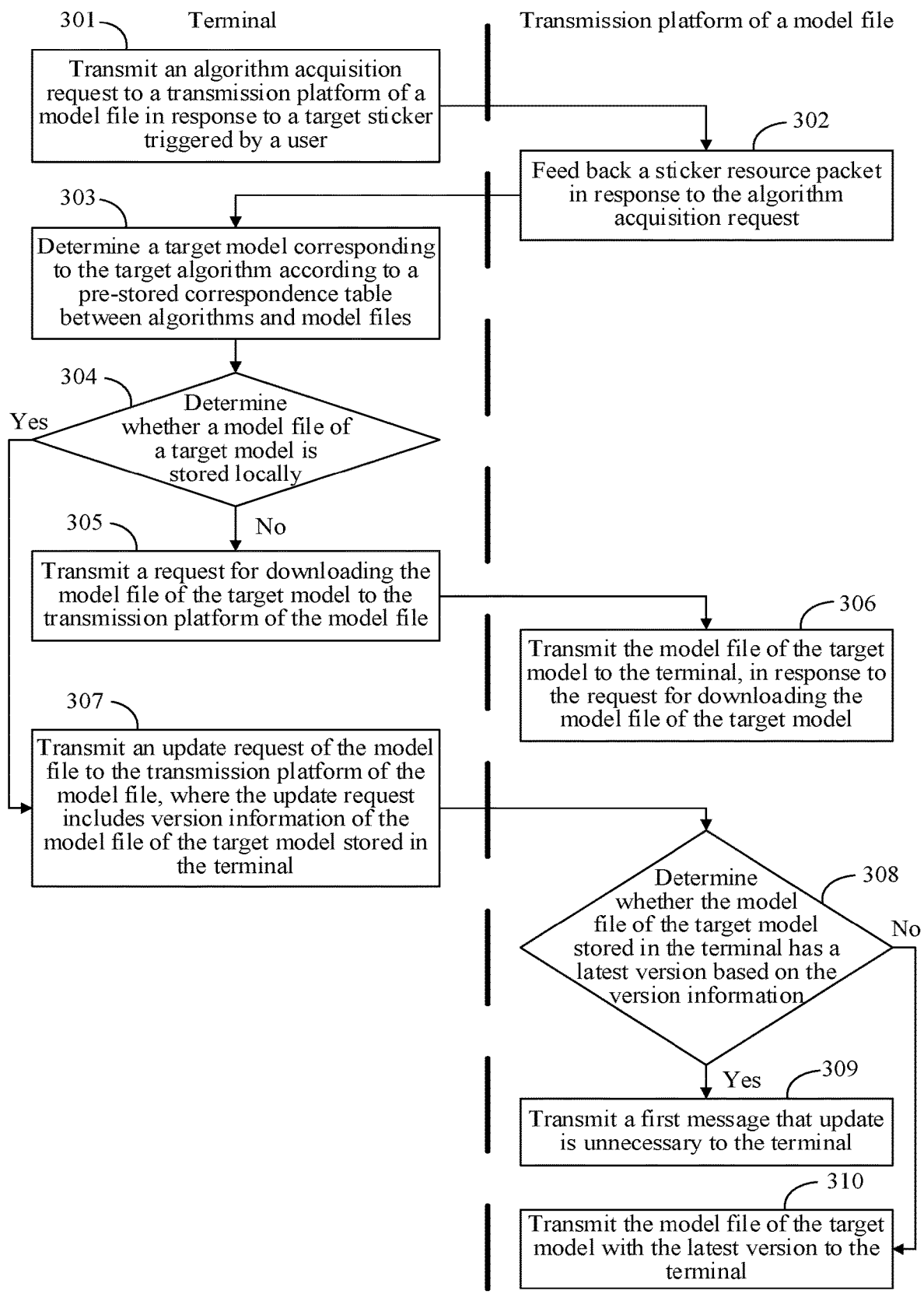
FIG. 3 is a schematic flowchart showing interaction between both sides in a method for transmitting a model file according to a third embodiment of the present disclosure.

In order to further clarity the method for transmitting a model file according to the present disclosure, based on the above embodiments, FIG. 3 shows a schematic flowchart indicating interaction between both sides in a method for transmitting a model file according to a third embodiment of the present disclosure. As shown in FIG. 3, the method includes steps 301 to steps 310 as follows.

In step 301, in response to a target sticker triggered by a user, a terminal transmits an algorithm acquisition request to a transmission platform of a model file.

In step 302, the transmission platform of the model file feeds back a sticker resource packet to the terminal in response to the algorithm acquisition request.

The sticker resource packet includes a target algorithm corresponding to the target sticker.

In step 303, the terminal determines a target model corresponding to the target algorithm according to a pre-stored correspondence table between algorithms and model files.

In step 304, the terminal determines whether a model file of the target model is stored locally. Step 307 is performed if it is determined that the model file of the target model is stored locally; otherwise, step 305 is performed.

In step 305, the terminal transmits a request for downloading the model file of the target model to the transmission platform of the model file.

In step 306, in response to the request for downloading the model file of the target model, the transmission platform of the model file transmits the model file of the target model to the terminal.

In step 307, the terminal transmits an update request of the model file to the transmission platform of the model file. The update request includes version information of the model file of the target model stored in the terminal.

In step 308, the transmission platform of the model file determines whether the model file of the target model stored in the terminal is the model file of the target model with a latest version according to the version information. Step 309 is performed if the determination result is positive in step 308; otherwise, step 310 is performed.

In step 309, a first message indicating that update is unnecessary is transmitted to the terminal.

In step 310, the model file of the target model with the latest version is transmitted to the terminal.

Similar to the first embodiment and the second embodiment, the user may select the target sticker from multiple stickers provided by the application, through an interaction interface of the application of the terminal. In this case, the terminal transmits the algorithm acquisition request to the transmission platform of the model file in response to the target sticker triggered by the user. The transmission platform of the model file feeds back a sticker resource packet to the terminal in response to the algorithm acquisition request. The sticker resource packet includes a target algorithm corresponding to the target sticker. Then, according to the pre-stored correspondence table between algorithms and model files, the terminal determines a target model corresponding to the target algorithm, and determines whether the model file of the target model is stored locally. The correspondence table between the algorithms and the model files is stored in the terminal in advance. After an application is installed, the terminal acquires the correspondence table during a process of initializing of the application. That is, the terminal transmits an initializing request to the transmission platform of the model file, to acquire the correspondence table between the algorithms and the model files transmitted by the transmission platform of the model file.

When the terminal determines that no model file of the target model is stored locally, the terminal transmits a request for downloading the model file of the target model to the transmission platform of the model file. The transmission platform of the model file transmits the model file of the target model to the terminal, in response to the request for downloading the model file of the target model. The request for downloading the model file of the target model transmitted by the terminal to the transmission platform of the model file further includes a terminal type. The transmission platform of the model file determines a model file matching with the terminal type based on the terminal type included in the request, and feeds back the model file to the terminal.

The above flow is similar to the above embodiments. For the specific principle and implementation, one may refer to the above embodiments, and details are not repeated herein.

With continuous upgrading and development of technology, algorithms and model files are updated. In an embodiment, when the terminal determines that the model file of the target model is stored locally, the terminal may transmit an update request of the model file to the transmission platform of the model file, and receives the model file of the target model with a latest version fed back by the transmission platform of the model file, so that the file executed by the terminal is always the model file with the latest version during running.

The update request transmitted by the terminal includes version information of the model file of the target model stored locally. The transmission platform of the model file determines whether the model file has a latest version based on the version information. Based on different determination results, the terminal may receive two different responses from the transmission platform of the model file. In a case that the model file has the latest version, the terminal receives a first message indicating that the model file is unnecessary to be updated. In a case that the model file does not have the latest version, the terminal receives the model file with the latest version.

In other words, the process of receiving the model file of the target model with the latest version fed back by the transmission platform of the model file may include: receiving a first message indicating that the model file is unnecessary to be updated which is transmitted by the transmission platform of the model file, where the first message is transmitted when the transmission platform of the model file determines that the model file of the target model has the latest version based on the version information included in the update request; or receiving the model file of the target model with the latest version transmitted by the transmission platform of the model file. The model file of the target model with the latest version is transmitted when the transmission model of the target model determines that the model file of the target model does not have the latest version based on the version information included in the update request.

Similar to the above embodiments, model files are different for different brands, models and loaded operating systems of the terminal. Therefore, in an embodiment, the request for updating the model file transmitted by the terminal to the transmission platform of the model file includes a terminal type, in order to ensure matching between the model file and the terminal. The transmission platform of the model file determines a model file of the target model with the latest version matching with the terminal type, and feeds back the model file.

In the method for transmitting the model file in this embodiment, based on the above embodiments, it is determined whether the model file stored in the terminal has the latest version, to ensure that the model file executed by the terminal is always the model file with the latest version, thereby optimizing the sticker function of the application and improving the application experience of the user.

Figure 4:
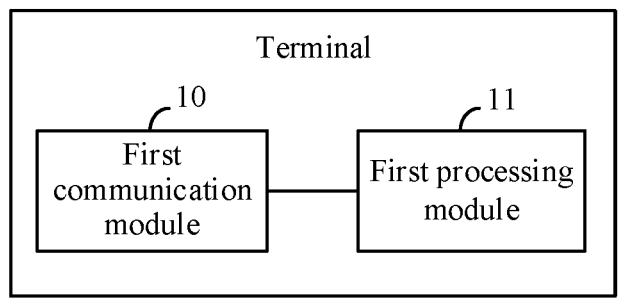
FIG. 4 is a schematic structural diagram of a terminal according to a fourth embodiment of the present disclosure.

FIG. 4 is a schematic structural diagram of a terminal according to a fourth embodiment of the present disclosure. As shown in FIG. 4, the terminal includes a first communication module 10 and a first processing module 11.

The first communication module 10 is configured to transmit, in response to a target sticker triggered by a user, an algorithm acquisition request to a transmission platform of a model file, and receive a sticker resource packet fed back by the transmission platform of the model file. The sticker resource packet includes a target algorithm corresponding to a target sticker.

The first processing module 11 is configured to determine a target model corresponding to the target algorithm according to a pre-stored correspondence table between algorithms and model files, and determine whether a model file of the target model is stored locally.

In a case that the first processing module 11 determines that no model file of the target model is stored locally, the first communication module 10 is configured to transmit a request for downloading the model file of the target model to the transmission platform of the model file, to acquire the model file of the target model fed back by the transmission platform of the model file.

In an embodiment, the first communication module 10 is configured to transmit an update request of the model file to the transmission platform of the model file, and receive a model file of the target model with a latest version fed back by the transmission platform of the model file.

In an embodiment, the update request includes version information of the model file of the target model stored locally.

The first communication module 10 is further configured to receive a first message transmitted by the transmission platform of the model file and indicating that the model file is unnecessary to be updated. The first message is transmitted when the transmission platform of the model file determines that the model file of the target model has the latest version based on the version information included in the update request.

Alternatively, the first communication 10 is further configured to: receive the model file of the target model with the latest version transmitted by the transmission platform of the model file. The model file of the target model with the latest version is transmitted when the transmission platform of the model file determines that the model file of the target model has no latest version based on the version information included in the update request.

In an embodiment, the update request of the model file further includes a terminal type, so that the transmission platform of the model file feeds back a model file of the target model with the latest version which matches with the terminal type.

In an embodiment, the request for downloading the model file of the target model further includes a terminal type, so that the transmission platform of the model file feeds back a model file matching with the terminal type.

In an embodiment, before the process of transmitting, in response to a target sticker triggered by a user, an algorithm acquisition request to a transmission platform of a model file, the first communication module 10 is configured to transmit an initialization request to the transmission platform of the model file, to acquire the correspondence table between algorithms and model files transmitted by the transmission platform of the model file.

It should be noted that, for the principle and implementation described in this embodiment, one may refer to corresponding content in the above embodiments, and details are not repeated herein.

Figure 5:
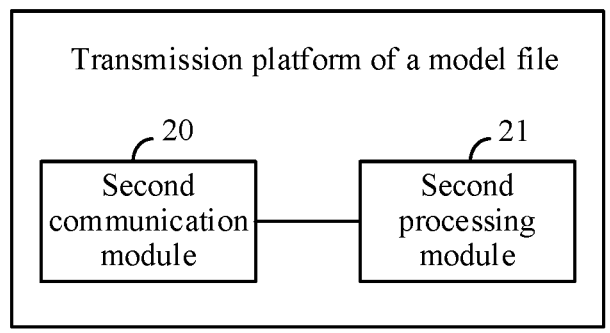
FIG. 5 is a schematic structural diagram of a transmission platform of a model file according to a fifth embodiment of the present disclosure.

According to the terminal provided in the present disclosure, the terminal transmits an algorithm acquisition request to a transmission platform of a model file in response to a target sticker triggered by a user, and receives a sticker resource packet fed back by the transmission platform. The sticker resource packet includes a target algorithm corresponding to a target sticker. The terminal determines a target model corresponding to the target algorithm according to a pre-stored correspondence table between algorithms and model files, and determines whether the model file of the target model is stored locally. In a case that the model file is not stored in the terminal, the terminal transmits a request for downloading the model file of the target model to the transmission platform of the model file, to acquire the model file of the target model fed back by the transmission platform, so that the model file is downloaded only when the user triggers the target sticker and no model file is stored in the terminal. That is, the model file of an application can be set separately from other installation files of the application. According to the technical solutions described above, the size of an installation packet of the application is effectively decreased, thereby shortening time for downloading the installation packet of the application FIG. 5 is a schematic structural diagram of a transmission platform of a model file according to a fifth embodiment of the present disclosure. As shown in FIG. 5, the transmission platform of the model file includes a second communication module 20 and a second processing module 21.

The second communication 20 is configured to receive an algorithm acquisition request transmitted by a terminal. The algorithm acquisition request includes a target sticker triggered by a user.

The second processing module 21 is configured to determine a sticker resource packet in response to the acquisition request and transmit the sticker resource packet to the terminal via the second communication module. The sticker resource packet includes a target algorithm corresponding to the target sticker, so that the terminal determines whether a model file of the target model corresponding to the target algorithm is stored locally.

The second communication module 20 is further configured to feed back the model file of the target model to the terminal when a request for downloading the model file of the target model transmitted by the terminal is received by the second communication module 20. The request for downloading the model file of the target model is transmitted when the terminal determines that no model file of the target model corresponding to the target algorithm is stored locally.

In an embodiment, the second communication module 20 is further configured to receive an update request of the model file transmitted by the terminal. The update request includes version information of the model file of the target model stored in the terminal.

The second processing module 21 is further configured to: determine, according to the version information, whether the model file of the target model stored in the terminal has a latest version; transmit a first message indicating that update is unnecessary to the terminal if it is determined that the model file of the target model stored in the terminal has the latest version; and transmit the model file of the target model with the latest version to the terminal, if it is determined that the model file of the target model stored in the terminal has no latest version.

In an embodiment, the update request of the model file further includes a terminal type. The second processing module 21 is configured to: determine, according to the terminal type, a model file of the target model with the latest version which matches with the terminal type. The second communication module 20 is configured to transmit the model file of the target model with the latest version to the terminal.

In an embodiment, the request for downloading a model file of the target model further includes a terminal type. The second processing module 21 is configured to: determine, according to the terminal type, a model file of the target model matching the terminal type. The second communication module 20 is configured to transmit the model file of the target model to the terminal.

In an embodiment, the second communication module 20 is configured to transmit, in response to an initialization request issued by the terminal, a pre-stored correspondence table between algorithms and model files to the terminal.

For the principle and implementation described in this embodiment, one may refer to corresponding contents in the above embodiments, and details are not repeated herein.

The transmission platform of a model file according to the present disclosure receives the algorithm acquisition request transmitted by the terminal, and transmits a sticker resource packet to the terminal in response to the acquisition request. The algorithm acquisition request includes a target sticker triggered by a user. The sticker resource packet includes a target algorithm corresponding to a target sticker. The terminal determines whether the model file of the target model corresponding to the target algorithm is stored locally. When a request for downloading the model file of the target model transmitted by the terminal is received, the transmission platform of the model file feeds back the model file of the target model to the terminal. The request for downloading the model file of the target model is transmitted when the terminal determines that no model file of the target model corresponding to the target algorithm is stored locally. In this case, the model file of an application can be set separately from other installation files of the application. According to the technical solutions described above, the size of an installation packet of the application is effectively decreased, thereby shortening time for downloading the installation packet of the application.

Figure 6:
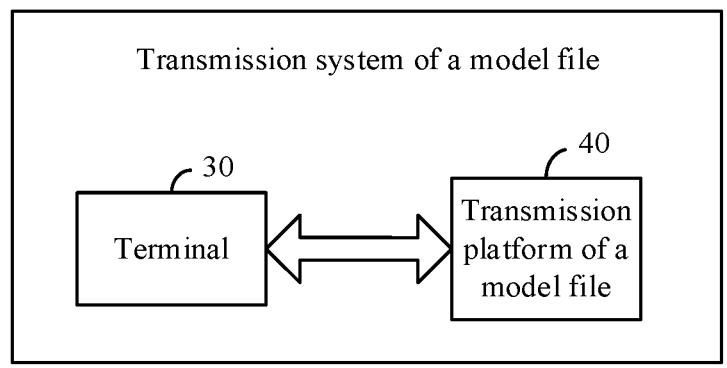
FIG. 6 is a schematic structural diagram of a transmission system of a model file according to a sixth embodiment of the present disclosure.

FIG. 6 is a schematic structural diagram of a transmission system according to a sixth embodiment of the present disclosure. As shown in FIG. 6, the transmission platform of the model includes a terminal and a transmission platform of a model file.

The terminal is configured to perform the method for transmitting a model file described in the first or third embodiment. The transmission platform of the model file is configured to perform the method for transmitting a model file described in the second or third embodiment.

Figure 7:
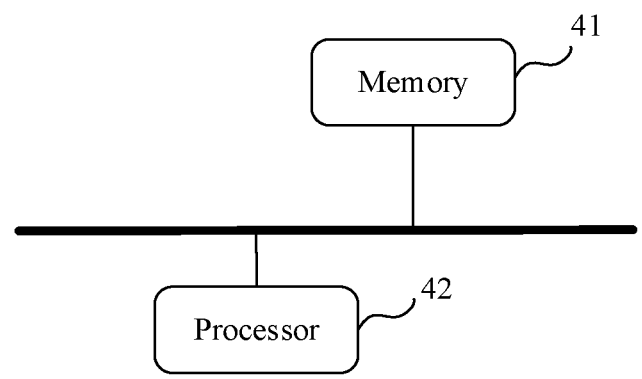
FIG. 7 is a schematic structural diagram of hardware structure of a terminal according to a seventh embodiment of the present disclosure.

FIG. 7 is a schematic structural diagram of a hardware structure of a terminal according to a seventh embodiment of the present disclosure. As shown in FIG. 7, the terminal includes a memory 41, a processor 42 and a computer program which is stored in the memory 41 and is executable in the processor 42. The processor 42 executes the computer program to perform the method described in the first or third embodiment.

Figure 8:
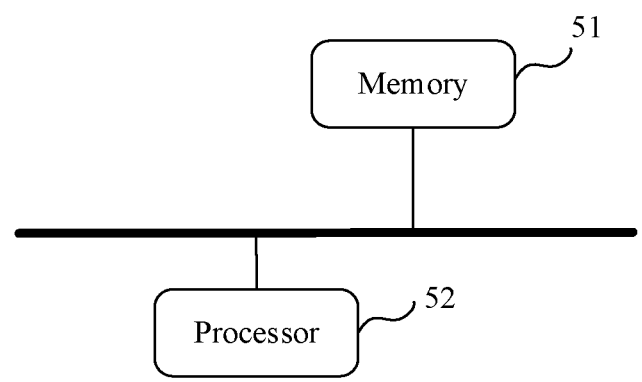
FIG. 8 is a schematic structural diagram of hardware structure of a transmission platform of a model file according to an eighth embodiment of the present disclosure.

FIG. 8 is a schematic structural diagram of a hardware structure of a transmission platform of a model file according to an eighth embodiment of the present disclosure. As shown in FIG. 8, the transmission platform of the model file includes a memory 51, a processor 52 and a computer program which is stored in the memory 51 and is executable in the processor 52. The processor 52 executes the computer program to perform the method described in the second or third embodiment.

Those skilled in the art should understand that all or a part of steps for implementing the above method embodiments may be realized by programs instructing a related hardware. The programs may be stored in a computer readable storage medium. When the programs are executed, steps of the above embodiments are performed. The storage medium includes mediums that may store program codes, such as a ROM, an RAM, a magnetic disk or an optical disk.

Those skilled in the art should understand that, for the operation process and corresponding beneficial effects of the above system, one may refer to the related description in the above method embodiments. Details are not repeated herein for convenience and conciseness of description.

A non-transitory readable storage medium is further provided according to the present disclosure. The medium stores a computer program. The computer program is executed by a processor to perform the method described in any of the above embodiments.

It should be noted that, the above embodiments are intended to illustrate the technical solutions of the present disclosure rather than limit the present disclosure. Although the present disclosure is described in detail with reference to the above embodiments, those skilled in the art should understand that the technical solutions recited in the above embodiments may be modified, or a part or all of the technical features may be equivalently replaced. The modification or replacement does not cause essence of corresponding technical solutions to depart from scope of the technical solutions of various embodiments of the present disclosure.

The invention claimed is:

1. A method for transmitting one or more model files, comprising:
   transmitting, in response to a target sticker triggered by a user, an algorithm acquisition request to a transmission platform configured to transmit the one or more model files, and receiving a sticker resource packet fed back by the transmission platform, wherein the sticker resource packet comprises a target algorithm corresponding to the target sticker;
   determining a target model corresponding to the target algorithm according to a pre-stored correspondence table between algorithms and model files;
   determining whether a model file of the target model is stored locally; and
   transmitting a request for downloading the model file of the target model to the transmission platform, to acquire the model file of the target model fed back by the transmission platform in response to determining that the model file of the target model is not stored locally.

2. The method according to claim 1, wherein in response to determining that the model file of the target model is stored locally, the method further comprises:
   transmitting an update request of the model file to the transmission platform, and receiving a model file of the target model with a latest version fed back by the transmission platform.

3. The method according to claim 2, wherein the update request comprises version information of the model file of the target model stored locally; and
   wherein the receiving a model file of the target model with a latest version fed back by the transmission platform comprises:
   receiving a first message transmitted by the transmission platform and indicating that the model file is unnecessary to be updated, wherein the first message is transmitted when the transmission platform determines that the model file of the target model has the latest version based on the version information comprised in the update request; or
   receiving the model file of the target model with the latest version transmitted by the transmission platform, wherein the model file of the target model with the latest version is transmitted when the transmission platform determines that the model file of the target model has no latest version based on the version information comprised in the update request.

4. The method according to claim 2, wherein the update request of the model file further comprises a terminal type, so that the transmission platform feeds back a model file of the target model having the latest version which matches with the terminal type.

5. The method according to claim 1, wherein the request for downloading the model file of the target model further comprises a terminal type, so that the transmission platform feeds back a model file matching with the terminal type.

6. The method according to claim 1, wherein before transmitting, in response to the target sticker triggered by the user, the algorithm acquisition request to the transmission platform, the method further comprises:
   transmitting an initialization request to the transmission platform, to acquire the correspondence table between the algorithms and the model files transmitted by the transmission platform.

7. A non-transitory readable storage medium storing a computer program, wherein the computer program is performed by a processor to perform the method according to claim 1.

8. A method for transmitting one or more model files, comprising:
   receiving an algorithm acquisition request transmitted by a terminal, wherein the algorithm acquisition request comprises a target sticker triggered by a user;
   transmitting a sticker resource packet to the terminal in response to the acquisition request, wherein the sticker resource packet comprises a target algorithm corresponding to the target sticker, and the terminal determines whether a model file of a target model corresponding to the target algorithm is stored locally; and
   feeding back the model file of the target model to the terminal when a request for downloading the model file of the target model transmitted by the terminal is received, wherein the request for downloading the model file of the target model is transmitted when the terminal determines that no model file of the target model corresponding to the target algorithm is stored locally.

9. The method according to claim 8, further comprising:
receiving an update request of the model file transmitted by the terminal, wherein the update request comprises version information of the model file of the target model stored in the terminal;
determining, according to the version information, whether the model file of the target model stored in the terminal has a latest version;
transmitting a first message indicating that update is unnecessary to the terminal in response to determining that the model file of the target model stored in the terminal has the latest version; and
transmitting the model file of the target model with the latest version to the terminal in response to determining that the model file of the target model stored in the terminal has no latest version.

10. The method according to claim 9, wherein the update request of the model file further comprises a terminal type; and
wherein the transmitting the model file of the target model with the latest version to the terminal comprises:
determining, according to the terminal type, a model file of the target model with the latest version which matches with the terminal type; and
transmitting the model file of the target model with the latest version to the terminal.

11. The method according to claim 8, wherein the request for downloading the model file of the target model further comprises a terminal type; and
wherein the feeding back the model file of the target model to the terminal comprises:
determining, according to the terminal type, a model file of the target model matching the terminal type; and
transmitting the model file of the target model to the terminal.

12. The method according to claim 8, further comprising:
transmitting, in response to an initialization request issued by the terminal, a pre-stored correspondence table between algorithms and model files to the terminal.

13. A transmission system of one or more model files, comprising a terminal and a transmission platform configured to transmit the one or more model files,
wherein the terminal comprising at least one first processor, and at least one first memory communicatively coupled to the at least one first processor and storing instructions that upon execution by the at least one first processor cause the terminal to:
transmit, in response to a target sticker triggered by a user, an algorithm acquisition request to the transmission platform, and receiving a sticker resource packet fed back by the transmission platform, wherein the sticker resource packet comprises a target algorithm corresponding to the target sticker,
determine a target model corresponding to the target algorithm according to a pre-stored correspondence table between algorithms and model files,
determine whether a model file of the target model is stored locally, and
transmit a request for downloading the model file of the target model to the transmission platform, to acquire the model file of the target model fed back by the transmission platform in response to determining that the model file of the target model is not stored locally; and
wherein the transmission platform comprising at least one second processor; and at least one second memory communicatively coupled to the at least one second processor and storing instructions that upon execution by the at least one second processor cause the transmission platform to:
receive an algorithm acquisition request transmitted by a terminal, wherein the algorithm acquisition request comprises the target sticker triggered by the user,
transmit the sticker resource packet to the terminal in response to the acquisition request, wherein the sticker resource packet comprises the target algorithm corresponding to the target sticker, and the terminal determines whether the model file of the target model corresponding to the target algorithm is stored locally, and
feedback the model file of the target model to the terminal when the request for downloading the model file of the target model transmitted by the terminal is received, wherein the request for downloading the model file of the target model is transmitted when the terminal determines that no model file of the target model corresponding to the target algorithm is stored locally.

14. The transmission system according to the claim 13, wherein the at least one first memory further stores instructions that upon execution by the at least one first processor cause the terminal to:
transmitting an update request of the model file to the transmission platform, and receiving a model file of the target model with a latest version fed back by the transmission platform.

15. The transmission system according to the claim 14, wherein the update request comprises version information of the model file of the target model stored locally;
and wherein the receiving a model file of the target model with a latest version fed back by the transmission platform comprises:
receiving a first message transmitted by the transmission platform and indicating that the model file is unnecessary to be updated, wherein the first message is transmitted when the transmission platform determines that the model file of the target model has the latest version based on the version information comprised in the update request; or
receiving the model file of the target model with the latest version transmitted by the transmission platform, wherein the model file of the target model with the latest version is transmitted when the transmission platform determines that the model file of the target model has no latest version based on the version information comprised in the update request.

16. The transmission system according to the claim 14, wherein the update request of the model file further comprises a terminal type, so that the transmission platform feeds back a model file of the target model having the latest version which matches with the terminal type.

17. The transmission system according to the claim 13, wherein the request for downloading the model file of the target model further comprises a terminal type, so that the transmission platform feeds back a model file matching with the terminal type.

18. The transmission system according to the claim 13, wherein before transmitting, in response to the target sticker triggered by the user, the algorithm acquisition request to the transmission platform, the at least one first memory further stores instructions that upon execution by the at least one first processor cause the terminal to:

transmit an initialization request to the transmission platform, to acquire the correspondence table between the algorithms and the model files transmitted by the transmission platform.

19. The transmission system according to the claim 13, wherein the at least second memory further stores instructions that upon execution by the at least one second processor cause the transmission platform to:
receive an update request of the model file transmitted by the terminal, wherein the update request comprises version information of the model file of the target model stored in the terminal;
determining, according to the version information, whether the model file of the target model stored in the terminal has a latest version;
transmitting a first message indicating that update is unnecessary to the terminal in response to determining that the model file of the target model stored in the terminal has the latest version; and
transmitting the model file of the target model with the latest version to the terminal in response to determining that the model file of the target model stored in the terminal has no latest version.

20. The transmission system according to the claim 19, wherein the update request of the model file further comprises a terminal type; and
wherein the transmitting the model file of the target model with the latest version to the terminal comprises:
determining, according to the terminal type, a model file of the target model with the latest version which matches with the terminal type; and
transmitting the model file of the target model with the latest version to the terminal.

* * * * *